(12) United States Patent
Shimoda et al.

(10) Patent No.: US 10,988,204 B2
(45) Date of Patent: Apr. 27, 2021

(54) BICYCLE APPARATUS

(71) Applicant: Shimano Inc., Osaka (JP)

(72) Inventors: Makoto Shimoda, Osaka (JP); Shinichiro Noda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/023,999

(22) Filed: Jun. 29, 2018

(65) Prior Publication Data

US 2018/0304961 A1 Oct. 25, 2018

Related U.S. Application Data

(63) Continuation of application No. 15/099,020, filed on Apr. 14, 2016, now Pat. No. 10,252,769.

(30) Foreign Application Priority Data

Apr. 28, 2015 (JP) .............................. JP2015-091510

(51) Int. Cl.
| | |
|---|---|
| *B60T 8/17* | (2006.01) |
| *B62L 3/02* | (2006.01) |
| *B62M 6/55* | (2010.01) |
| *B62J 27/00* | (2020.01) |
| *B60T 8/32* | (2006.01) |

(52) U.S. Cl.
CPC .............. *B62L 3/023* (2013.01); *B60T 8/3225* (2013.01); *B62J 27/00* (2013.01); *B62M 6/55* (2013.01); *Y02T 10/72* (2013.01)

(58) Field of Classification Search
CPC ...... B60T 8/1706; B60T 8/261; B60T 8/3225; B60T 8/4027; B60T 8/4233; B60T 8/4208; B60T 8/4266; B62M 6/40; B62M 6/45; B62M 6/55; B62M 19/00
See application file for complete search history.

(56) References Cited

U.S. PATENT DOCUMENTS

| | | |
|---|---|---|
| 4,249,750 A | 2/1981 | Kantner |
| 4,942,936 A | 7/1990 | Gardner, Jr. |
| 6,450,586 B1 | 9/2002 | Nagano |
| 8,550,199 B2 | 10/2013 | Moeller et al. |

(Continued)

FOREIGN PATENT DOCUMENTS

| | | |
|---|---|---|
| CN | 103287409 A | 9/2013 |
| DE | 10 2011 084601 A1 | 4/2013 |

(Continued)

*Primary Examiner* — Bradley T King
*Assistant Examiner* — Stephen M Bowes
(74) *Attorney, Agent, or Firm* — Global IP Counselors, LLP

(57) ABSTRACT

A bicycle apparatus includes an ABS unit, a wheel detection device and a control device. The ABS unit is configured to control a braking force, and the wheel detection device is configured to detect a rotational speed. The control device is configured to receive detection results to determine whether the bicycle is in a prescribed state. The control device is configured to control the ABS unit upon determining the bicycle is in the prescribed state. The prescribed state includes at least one of a state in which a difference between the rotational speeds of the front and rear wheels is greater than or equal to a prescribed rotational speed, and a state in which a change in the rotational speed of the at least one of the front wheel and rear wheels is greater than or equal to a prescribed value has occurred.

15 Claims, 5 Drawing Sheets

(56) References Cited

U.S. PATENT DOCUMENTS

| | | | |
|---|---|---|---|
| 9,561,785 B2* | 2/2017 | Iizuka | B60T 8/1706 |
| 2008/0111342 A1 | 5/2008 | Niekerk et al. | |
| 2008/0115995 A1* | 5/2008 | Holland | B60T 8/3225 |
| | | | 180/216 |
| 2010/0252345 A1 | 10/2010 | Hoshino | |
| 2011/0001442 A1 | 1/2011 | Lee et al. | |
| 2012/0010036 A1 | 1/2012 | Moeller | |
| 2012/0012412 A1 | 1/2012 | Moeller et al. | |
| 2012/0200148 A1* | 8/2012 | Waida | B60T 8/3225 |
| | | | 303/191 |
| 2012/0303234 A1* | 11/2012 | Matsuda | B60T 8/1706 |
| | | | 701/71 |
| 2012/0316710 A1* | 12/2012 | Saida | B62M 6/45 |
| | | | 701/22 |
| 2015/0344009 A1* | 12/2015 | Hagspiel | B62L 3/023 |
| | | | 303/119.1 |
| 2016/0167732 A1* | 6/2016 | Modolo | B62M 6/50 |
| | | | 701/22 |
| 2016/0318575 A1 | 11/2016 | Shimoda et al. | |
| 2017/0151829 A1* | 6/2017 | Neutsch | B60B 1/003 |
| 2017/0291661 A1 | 10/2017 | Lee | |
| 2018/0056952 A1* | 3/2018 | Ono | B60T 8/1706 |

FOREIGN PATENT DOCUMENTS

| | | |
|---|---|---|
| DE | 10 2012 222048 A1 | 6/2014 |
| DE | 10 2012 222058 A1 | 6/2014 |
| DE | 10 2012 222072 A1 | 6/2014 |
| DE | 10 2012 222079 A1 | 6/2014 |
| DE | 10 2012 222087 A1 | 6/2014 |
| EP | 2 067 694 A1 | 6/2009 |
| EP | 2 450 247 A1 | 10/2011 |
| JP | 6-255558 A | 9/1994 |
| JP | 7-232686 A | 9/1995 |
| JP | 9-272487 A | 10/1997 |
| JP | 10-203467 A | 8/1998 |
| JP | 2001-146155 A | 5/2001 |
| JP | 2004-243921 A | 9/2004 |
| JP | 2008-213512 A | 9/2008 |
| JP | 2011-63202 A | 3/2011 |
| JP | 2011-126426 A | 6/2011 |
| JP | 2012-53208 A | 3/2012 |
| JP | 2012-96753 A | 5/2012 |
| JP | 2012-517382 A | 8/2012 |
| JP | 2014-58228 A | 4/2014 |
| JP | 2014-128992 A | 7/2014 |
| JP | 2015-16711 A | 1/2015 |
| JP | 2015-51731 A | 3/2015 |
| JP | 2016-203932 A | 12/2016 |
| KR | 10 2012 0067135 A | 6/2012 |
| WO | 2007 117149 A1 | 10/2007 |
| WO | 2013/178441 A1 | 12/2013 |
| WO | 2014 108235 A1 | 7/2014 |

* cited by examiner

BICYCLE APPARATUS

CROSS-REFERENCE TO RELATED APPLICATIONS

This application is a continuation application of U.S. application Ser. No. 15/099,020, filed on Apr. 14, 2016. The entire disclosure of U.S. application Ser. No. 15/099,020 is hereby incorporated herein by reference. This application claims priority to Japanese Patent Application No. 2015-091510, filed on Apr. 28, 2015. The entire disclosure of Japanese Patent Application No. 2015-091510 is hereby incorporated herein by reference.

BACKGROUND

Field of the Invention

The present invention generally relates to a bicycle apparatus. More specifically, the present invention relates to a bicycle apparatus equipped with an ABS unit (Antilock Brake System).

Background Information

A bicycle apparatus comprising an ABS unit is known. For example, a bicycle apparatus having an ABS unit is disclosed in International Publication No. WO 2014/108235. In the bicycle apparatus of this publication, the ABS unit controls a braking force that is applied to a wheel of a bicycle.

SUMMARY

Generally, the present disclosure is directed to various features of a bicycle apparatus comprising an ABS unit.

The above-described bicycle apparatus is equipped with a drive source for driving the ABS unit. For this reason, the bicycle apparatus is increased in size as compared to a bicycle without an ABS unit.

One object of the present invention is to provide a bicycle apparatus which is not easily increased in size, even when equipped with an ABS unit.

In view of the state of the known technology and in accordance with a first aspect of the present disclosure, a bicycle apparatus according to the present invention comprises an ABS unit, a wheel detection device and a control device. The ABS unit is configured to control a braking force that is applied to at least one of a front wheel and a rear wheel of a bicycle. The wheel detection device configured to detect a rotational speed of at least one of the front and rear wheels. The control device configured to receive detection results from the wheel detection device. The control device is further configured to determine whether the bicycle is in a prescribed state based on the detection results of the wheel detection device. The control device is further configured to execute an ABS operation control to control the ABS unit upon determining the bicycle is in the prescribed state. The prescribed state includes at least one of a state in which a difference between the rotational speeds of the front and rear wheels is greater than or equal to a prescribed rotational speed, and a state in which a change in the rotational speed of the at least one of the front wheel and rear wheels is greater than or equal to a prescribed value has occurred.

According to the bicycle apparatus described above, the size in not easily increased even when mounting an ABS unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
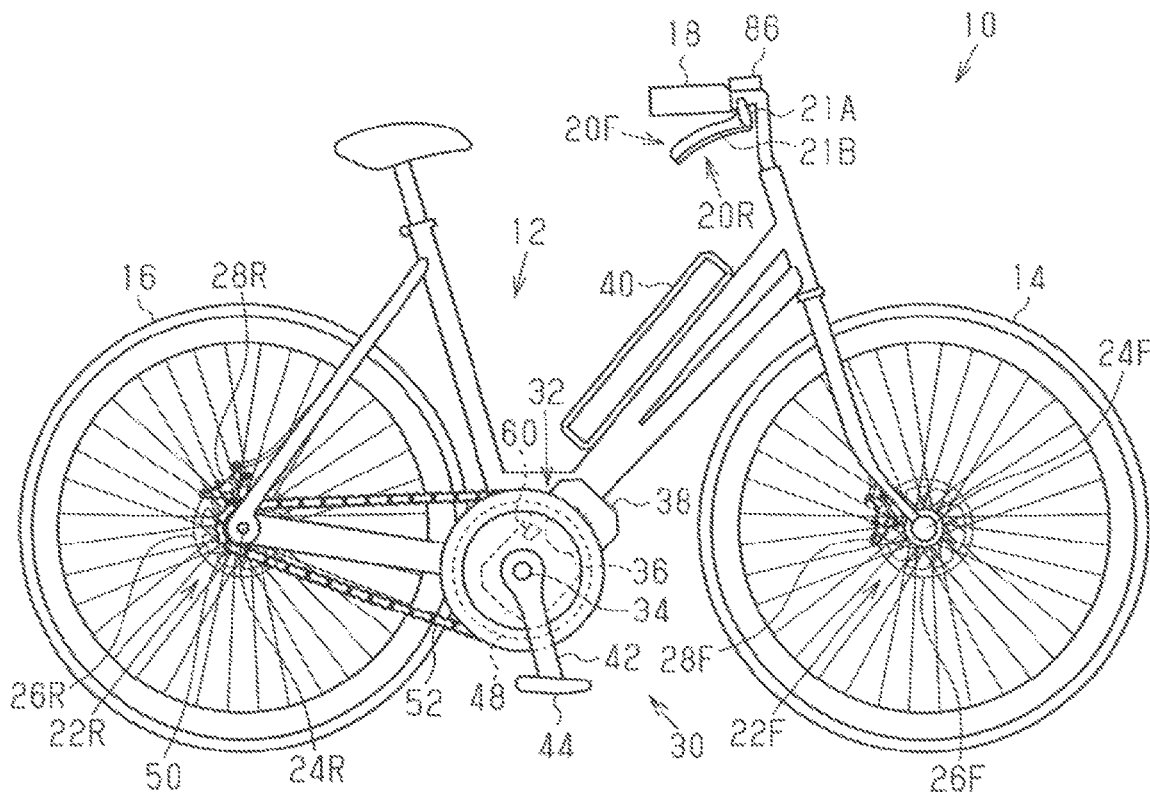
FIG. 1 is a side elevational view of a bicycle that is equipped with a bicycle apparatus that has an ABS unit in accordance with a first embodiment.

Referring initially to FIG. 1, a bicycle 10 is illustrated that is equipped in accordance with a first embodiment. FIG. 1 is the outer appearance of an electrically assisted bicycle (hereinafter referred to as "bicycle 10"). The bicycle 10 comprises a frame 12, a front wheel 14, a rear wheel 16 and a handlebar 18. The frame 12 forms the main body of the bicycle 10. The front wheel 14 and the rear wheel 16 are wheels which are rotatably attached to the frame 12. The handlebar 18 is operated for changing the orientation of the front wheel 14. The bicycle 10 further comprises a pair of brake levers 20F and 20R which are operating devices that are attached to the handlebar 18. The bicycle 10 further comprises a brake device 22F (e.g., a front brake) for applying a braking force to the front wheel 14, and a brake device 22R (e.g., a rear brake) for applying a braking force to the rear wheel 16. The diameter of the front wheel 14 and the rear wheel 16 are substantially the same.

Each of the brake devices 22F and 22R are, for example, a disc brake. The brake devices 22F and 22R are comprised of the disc rotors 26F and 26R which are fixed to the hubs 24F and 24R so as to be integrally rotated with the wheels, a pair of brake pads (not shown), and the calipers 28F and 28R which brake the rotation of the disk rotors 26F and 26R, by pressing the brake pads to the disk rotors 26F and 26R.

The brake lever 20F among the pair of brake levers 20F and 20R is connected to the caliper 28F for braking the front wheel 14. The brake lever 20R is connected to the caliper 28R for braking the rear wheel 16. The calipers 28F and 28R squeeze the disk rotors 26F and 26F via the brake pads, by the corresponding brake levers 20F and 20R being operated. The rotation of the wheels is thereby slowed or stopped but actuation of the calipers 28F and 28R.

Each of the brake levers 20F and 20R comprises a base portion 21A, a lever portion 21B and a piston (not shown). The base portion 21A is attached to the handlebar 18. The lever portion 21B is rotatably coupled with the base portion 21A. The piston (not shown) is coupled to the lever portion 21B. When the brake levers 20F and 20R are operated, the lever portions 21B are displaced with respect to the base portions 21A, from their initial positions, which are the positions of the lever portions 21B when a force is not applied to them.

The bicycle 10 further comprises a drive mechanism 30 for transmitting a drive force to the rear wheel. The drive mechanism 30 comprises a drive unit 32 which is detachably fixed to the frame 12. The drive mechanism 30 further comprises a crankshaft 34 which is rotatably attached to the drive unit 32. The drive unit 32 comprises an assist motor 36 and a housing 38. The assist motor 36 is configured to add an assisting force to a manual drive force, which is inputted from the crankshaft 34. The housing 38 is configured to house a plurality of mechanical elements. The assist motor 36 is an electric motor, and is provided to the housing 38. The assist motor 36 can be provided to the internal space of the housing 38. The bicycle 10 further comprises a battery 40 for supplying electric power to the assist motor 36. The battery 40 is attached to the frame 12.

The drive mechanism 30 further comprises a pair of crank arms 42 and a pair of pedals 44. The crank arms 42 are coupled to the crankshaft 34. One of the pedals 44 is rotatably attached to one of the crank arms 42. The drive mechanism 30 further comprises a front sprocket 48, a rear sprocket 50 and a chain 52. The front sprocket 48 is coupled to the crankshaft 34 via a one-way clutch 46 (refer to FIG. 2). The rear sprocket 50 is rotatably attached to the hub 24R of the rear wheel 16 via a free wheel (not shown). The chain 52 is wound onto the front sprocket 48 and the rear sprocket 50.

If a manual drive force is inputted to the pedal 44 for rotating the crank arm 42 in a forward driving direction, then the crank arm 42 and the crankshaft 34 are integrally rotated forward with respect to the frame 12. The rotation of the crankshaft 34 rotates the front sprocket 48, and the rotation of the front sprocket 48 is then transmitted to the rear sprocket 50 and the rear wheel 16 by the chain 52. On the other hand, if a manual drive force is inputted to the pedal 44 for rotating the crank arm 42 in a backward non-driving direction, and then the crank arm 42 and the crankshaft 34 are integrally rotated backward with respect to the frame 12. The rotation of the crankshaft 34 is not transmitted to the front sprocket 48 by the one-way clutch 46.

The assist motor 36 is rotated in a first direction in accordance with the manual drive force which rotates the crank arm 42 forward. When the assist motor 36 is rotated in the first direction, the rotation of the assist motor 36 is transmitted to the front sprocket 48 via a speed reducing mechanism (not shown) and a one-way clutch 54 (refer to FIG. 2). Accordingly, an assisting force is added to the manual drive force.

Figure 2:
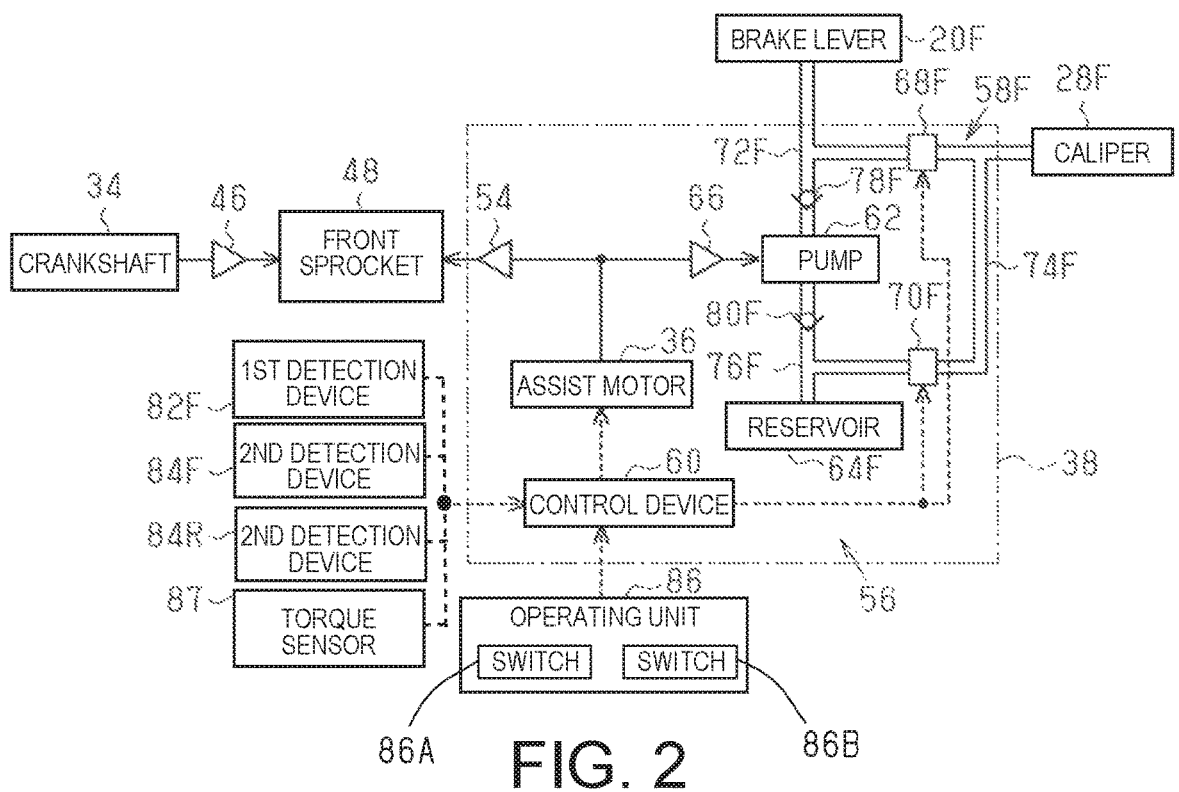
FIG. 2 is a block diagram of the bicycle illustrated in FIG. 1.

FIG. 2 shows the electrical or the mechanical connection relationships of the bicycle 10 (refer to FIG. 1). The broken lines of FIG. 2 show the electrical connection relationships of the bicycle 10. The solid lines of FIG. 2 show the mechanical connection relationships of the bicycle 10.

The bicycle 10 further comprises a bicycle apparatus 56 which is formed of a plurality of mechanical elements including the drive unit 32 (refer to FIG. 1). The bicycle apparatus 56 comprises an ABS unit 58F and a control device 60. The ABS unit 58F is driven by the assist motor 36 for controlling a braking force which is applied from the caliper 28F to the front wheel 14 (refer to FIG. 1). The control device 60 is programmed for controlling the assist motor 36 and the ABS unit 58F. The ABS unit 58F is housed in the internal space of the housing 38.

The ABS unit 58F comprises a pump 62 and a reservoir 64F. The pump 62 supplies the hydraulic oil and applies a hydraulic pressure to the caliper 28F. The reservoir 64F accumulates the hydraulic oil. The pump 62 includes, for example, a piston pump, a gear pump, or the like. A one-way clutch 66 is disposed between the assist motor 36 and the pump 62. The one-way clutch 66 is a compositional element of the bicycle apparatus 56. The pump 62 is mechanically connected to the assist motor 36 via the one-way clutch 66.

The one-way clutch 66 transmits the rotation of the assist motor 36 to the pump 62, when an output shaft of the assist motor 36 is rotated in a second direction, which is the opposite of the first direction. Accordingly, when the assist motor 36 is rotated in the second direction, the pump 62 is driven via the one-way clutch 66. On the other hand, the one-way clutch 66 does not transmit the rotation of the assist motor 36 to the pump 62, when the output shaft of the assist motor 36 is rotated in the first direction. The bicycle apparatus 56 can further comprise a speed reducing mechanism (not shown) on a power transmission path between the assist motor 36 and the pump 62.

The ABS unit 58F further comprises a first valve 68F and a second valve 70F which adjust the hydraulic pressure which is applied to the caliper 28F. The first valve 68F is disposed on a pipeline which connects the brake lever 20F and the caliper 28F. The second valve 70F is disposed on a pipeline which connects the caliper 28F and the reservoir 64F.

The first valve 68F and the second valve 70F include a solenoid valve or a motorized valve. When each of the valves 68F and 70F includes a solenoid valve, preferably from the point of view of suppressing the waste of the power, the solenoid valve of the first valve 68F is opened when power not provided and the solenoid valve of the second valve 70F is closed when power not provided. The hydraulic pressure that is applied to the caliper 28F is controlled by the control device 60 for controlling the opening and closing of each of the valves 68F and 70F.

When the hydraulic pressure that is applied to the caliper 28F is high, the caliper 28F is brought close to the disk rotor 26F (refer to FIG. 1). In this case, the caliper 28F squeezes the disk rotor 26F via the brake pad, and the rotation of the front wheel 14 is braked. On the other hand, when the hydraulic pressure that is applied to the caliper 28F is low, the caliper 28F is separated from the disk rotor 26F. Accordingly, the rotation of the front wheel 14 is not braked.

The hydraulic oil that is supplied from the pump 62 flows through the first pipeline 72F, the second pipeline 74F, and the third pipeline 76F. The first pipeline 72F, the second pipeline 74F, and the third pipeline 76F are each a pipeline that branches into three. The three ends of the first pipeline 72F are connected to the brake lever 20F, the pump 62, and the first valve 68F. The three ends of the second pipeline 74F are connected to the caliper 28F, the first valve 68F, and the second valve 70F. The three ends of the third pipeline 76F are connected to the pump 62, the reservoir 64F, and the second valve 70F.

The ABS unit 58F further comprises a first check valve 78F and a second check valve 80F. The first check valve 78F is disposed in the first pipeline 72F. The second check valve 80F is disposed in the third pipeline 76F. The first check valve 78F enables the hydraulic oil to flow from the pump 62 to the brake lever 20F, and does not allow the hydraulic oil to flow to in the opposite direction. The second check valve 80F enables the hydraulic oil to flow from the reservoir 64F to the pump 62, and does not allow the hydraulic oil to flow in the opposite direction. Accordingly, the hydraulic oil is supplied from the third pipeline 76F, which is connected to the reservoir 64F, to the first pipeline 72F, by the pump 62 being driven. When the pump 62 is driven, the hydraulic pressure of the first pipeline 72F is raised. Further, if the second valve 70F is opened, then the hydraulic oil flows from the second pipeline 74F to the third pipeline 76F via the second valve 70F, along with the pump 62 being driven.

The bicycle 10 further comprises a first detection device 82F (e.g., a brake lever detection device), a second detection device 84F (e.g., a front wheel detection device) and a second detection device 84R (e.g., a rear wheel detection device). The first detection device 82F is configured to detect the operating state of the brake lever 20F. The second detection device 84F is configured to detect the rotation state of the front wheel 14. The second detection device 84R is configured to detect the rotation state of the rear wheel 16 (refer to FIG. 1). The first detection device 82F and each of the second detection devices 84F and 84R are electrically connected to the control device 60.

The first detection device 82F is a first sensor for detecting whether or not a user is operating the lever portion 21B of the brake lever 20F (refer to FIG. 1). The first detection device 82F is, for example an angle sensor which is attached to the brake lever 20F. The angle sensor includes, for example, a potentiometer, a magnetic sensor, an optical sensor, or the like. The first detection device 82F is configured to detect the operating state of the brake lever 20F by detecting the operation angle, which is the angle of the lever portion 21B with respect to the base portion 21A (refer to FIG. 1). Meanwhile, in the case that the angle sensor includes a magnetic sensor, a magnetic sensor provided to the base portion 21A detects the movement of a magnet provided to the lever portion 21B.

The second detection device 84F comprises a magnetic sensor and a magnet. The magnetic sensor of the second detection device 84F is attached to, for example, the frame 12 (refer to FIG. 1) in the vicinity of the front wheel 14. The magnet of the second detection device 84F is attached to the disk rotor 26F or the spoke of the front wheel 14. The second detection device 84F detects the rotational speed of the front wheel 14 in the rotation state, by the magnetic sensor detecting the magnet. The second detection device 84F can be provided with several magnets, which are arranged to rotate along with the front wheel 14. These magnets can be provided in the circumferential direction of the front wheel 14, and can be formed in an annular shape and magnetized in alternately different polarities in the circumferential direction.

The second detection device 84R comprises a magnetic sensor and a magnet. The magnetic sensor of the second detection device 84R is attached to, for example, the frame 12 in the vicinity of the rear wheel 16. The magnet of the second detection device 84R is attached to the disk rotor 26R or the spoke of the rear wheel 16. The second detection device 84R detects the rotational speed of the rear wheel 16 in the rotation state, by the magnetic sensor detecting the magnet. The second detection device 84R can be provided with several magnets, which arranged to rotate along with the rear wheel 16. These magnets can be provided in the circumferential direction of the rear wheel 16, and can be formed in an annular shape and magnetized with alternately different polarities in the circumferential direction.

The control device 60 calculates the vehicle speed, which is the speed of the bicycle 10, on the basis of the detection result of at least one rotational speed of the front wheel 14 and the rear wheel 16, which is detected by each of the second detection devices 84F and 84R. The control device 60 calculates the vehicle speed of the bicycle 10, on the basis of the detection result of the higher rotational speed, of the detection results of the second detection devices 84F and 84R.

The bicycle 10 further comprises an operating unit 86 and a torque sensor 87. The operating unit 86 is attached to the handlebar 18 (refer to FIG. 1), and is operated for switching the operation mode of the assist motor 36. The torque sensor 87 is configured to detect the manual drive force. The operating unit 86 and the torque sensor 87 are electrically connected to the control device 60. The torque sensor 87 is provided on a power transmission path between, for example, the crankshaft 34 and the front sprocket 48. The torque sensor 87 includes, for example, a strain sensor or a magnetostrictive sensor.

The operating unit 86 comprises an assist selection switch (not shown) for selecting the operation mode of the assist motor 36. When the operation mode of the assist motor 36 is set to an assist ON mode by the assist selection switch, power is supplied from the battery 40 (refer to FIG. 1) to the assist motor 36 in accordance with the detection result of the torque sensor 87. On the other hand, when the operation mode of the assist motor 36 is set to an assist OFF mode by the assist selection switch, the manual drive force is not assisted by the assist motor 36.

The operating unit 86 further comprises an ABS operation changeover switch (not shown) for switching between an ABS operating mode which puts the ABS unit 58F in an operable state, and an ABS non-operating mode which puts the ABS unit 58F in a non-operating state. The control of the ABS unit 58F by the control device 60 is carried out by the ABS non-operating mode being switched to the ABS operating mode by the ABS operation changeover switch. The control of the ABS unit 58F by the control device 60 is not dependent on an operation of the assist selection switch.

The control device 60 controls the output and the rotational direction of the assist motor 36, on the basis of the detection results of the first detection device 82F and the second detection devices 84F and 84R. The control device 60 comprises a microprocessor and a memory. The control device 60 is operated by the microprocessor executing a program which is stored in the memory. The control device 60 switches the open/close state of the first valve 68F and the second valve 70F between a first pattern, a second pattern, and a third pattern, on the basis of the detection results of the first detection device 82F and the second detection devices 84F and 84R. Table 1 shows the open/close state of the first valve 68F and the second valve 70F in each of the patterns.

TABLE 1

| opened/closed state | first valve | second valve |
|---|---|---|
| first pattern | opened | closed |
| second pattern | closed | opened |
| third pattern | closed | closed |

The first pattern is a state in which the first valve 68F is opened and the second valve 70F is closed. The second pattern is a state in which the first valve 68F is closed and the second valve 70F is opened. The third pattern is a state in which both the first valve 68F and the second valve 70F are closed. When set to the ABS non-operating mode by the operating unit 86, the first pattern is selected.

When the first pattern is selected, a piston of the brake lever 20F compresses the hydraulic oil in the first pipeline 72F and the second pipeline 74F, by the brake lever 20F being operated. That is, the hydraulic pressure of the second pipeline 74F is raised, and the hydraulic pressure which is applied to the caliper 28F is increased. Accordingly, the caliper 28F squeezes the disk rotor 26F via the brake pad, and the rotation of the front wheel 14 is braked, by the brake lever 20F being operated.

When the second pattern is selected, the hydraulic oil in the second pipeline 74F is moved into the third pipeline 76F; therefore, the hydraulic pressure of the second pipeline 74F is reduced. Accordingly, the hydraulic pressure which is applied to the caliper 28F is also reduced, and the braking force which is applied to the front wheel 14 is weakened. The hydraulic oil of the third pipeline 76F flows into the reservoir 64F and the pump 62. In the second pattern, since the first valve 68F is closed, the hydraulic pressure of the second pipeline 74F does not change even if the brake lever 20F is operated. Accordingly, the braking force which is applied to the front wheel 14 is not dependent on the operation of the brake lever 20F.

When the third pattern is selected, the hydraulic oil in the second pipeline 74F is held in the second pipeline 74F; therefore, the hydraulic pressure of the second pipeline 74F is maintained. Accordingly, the hydraulic pressure which is applied to the caliper 28F is also maintained, and the braking force which is applied to the front wheel 14 is kept constant. In the third pattern, since the first valve 68F is closed, the braking force which is applied to the front wheel 14 is not dependent on the operation of the brake lever 20F, in the same way as in the second pattern.

Figure 3:
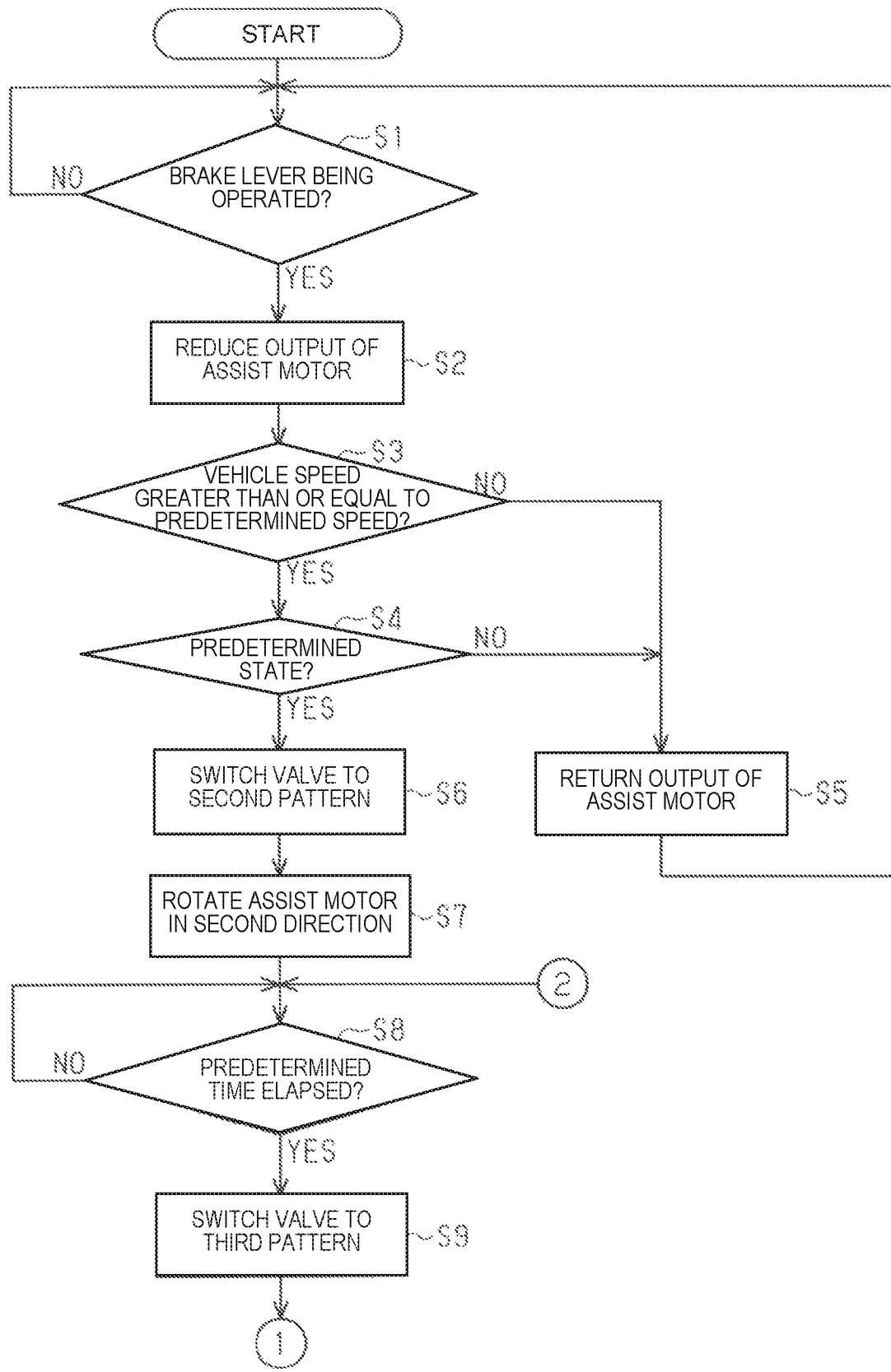
FIG. 3 is a flowchart for a control executed by the control device illustrated in FIG. 1.
Figure 4:
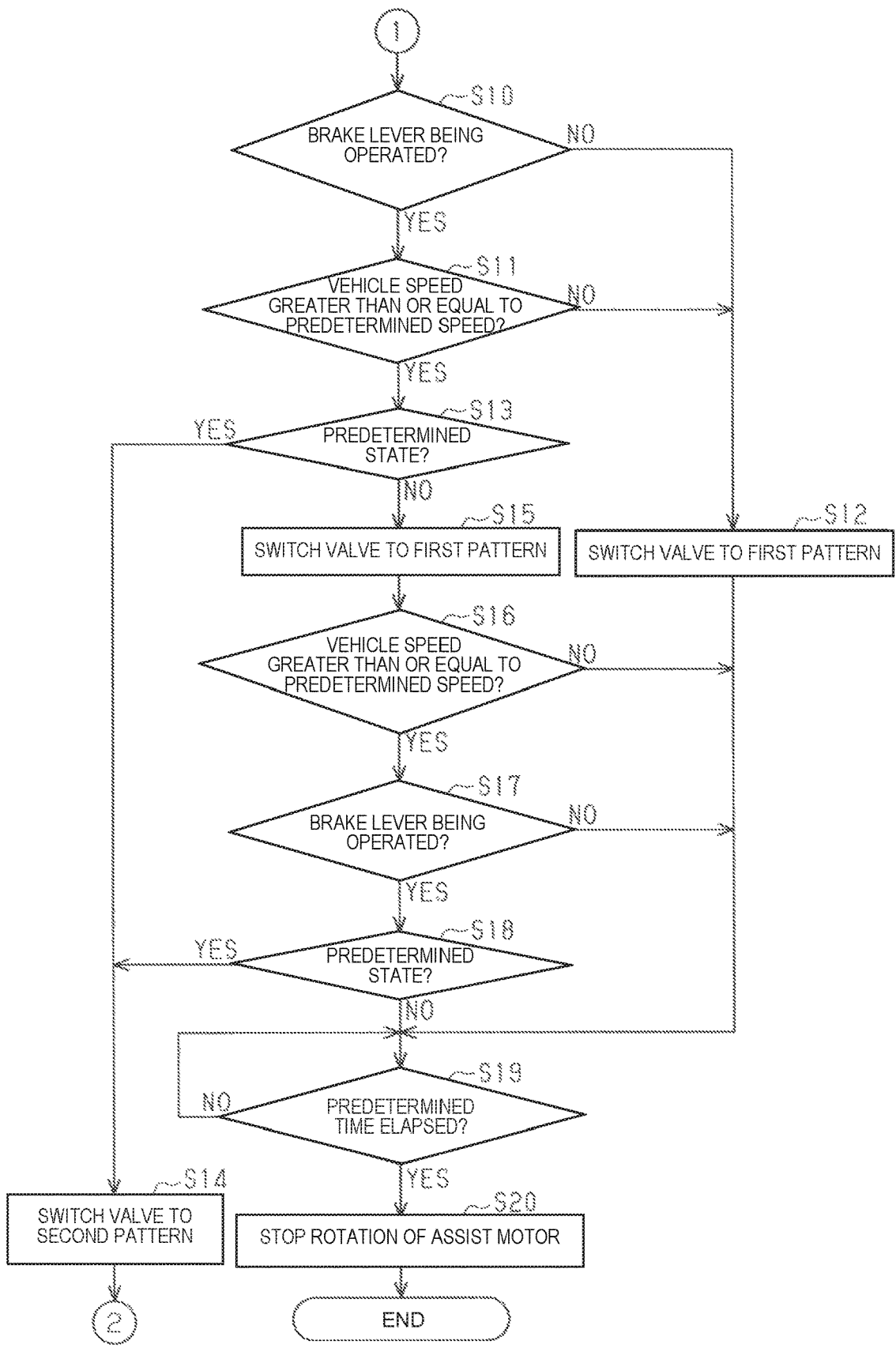
FIG. 4 is a flowchart for a control executed by the control device illustrated in FIG. 1.

FIGS. 3 and 4 are flowcharts of the ABS operation control which is executed by the control device 60. The control device 60 starts the steps shown in FIGS. 3 and 4, by being set to the ABS operating mode by the operating unit 86. Thus, when set to the ABS operating mode, the steps shown in FIGS. 3 and 4 are started by turning ON the power of the control device 60. The ON and OFF of the power of the control device 60 is switched by the operating unit 86. Here, a case in which the assist ON mode is selected by the operating unit 86 will be described.

The control device 60 causes the assist motor 36 to be rotated in the first direction in accordance with the manual drive force. Further, the open/close state of the valves 68F and 70F is maintained in the first pattern until switched by the control device 60.

The control device 60 determines whether or not the brake lever 20F is being operated on the basis of the detection result of the first detection device 82F, in step S1. If the brake lever 20F is determined to be not operated in step S1, the steps of step S1 are executed again. On the other hand, if the brake lever 20F is determined to be operated in step S1, the steps of step S2 are executed. When executing an ABS operation control only to the front wheel 14 as in the present first embodiment, only the brake lever 20F which corresponds to the front wheel 14 is set as the detection target. On the other hand, when executing an ABS operation control only to the rear wheel 16, only the brake lever 20R which corresponds to the rear wheel 16 is set as the detection target.

The control device 60 reduces the output of the assist motor 36 when causing the assist motor 36 to be rotated in the first direction in accordance with the manual drive force, in step S2. Then, the control device 60 ultimately stops the assist motor 36 by causing the output of the assist motor 36 to be reduced.

The control device 60 determines whether or not the vehicle speed of the bicycle 10 is greater than or equal to a prescribed speed, on the basis of the detection results of the second detection devices 84F and 84R, in step S3. The prescribed speed is preferably a speed of, for example, less than or equal to 5 km/hour. If the vehicle speed is determined to be greater than or equal to the prescribed speed in step S3, the steps of step S4 are executed.

The control device 60 determines whether or not the state of the bicycle 10 is in a prescribed state, on the basis of the detection results of the second detection devices 84F and 84R, in step S4. The prescribed state is a state in which at least one of the following is established: a state in which the difference between the rotational speed of the front wheel 14 and the rotational speed of the rear wheel 16 is greater than or equal to a prescribed speed, and, a state in which a change in the rotational speed that is greater than or equal to a prescribed value has occurred in the wheels.

When executing an ABS operation control only to the front wheel 14, as in the present first embodiment, only the front wheel 14 is set as the detection target, in terms of whether or not the state is one in which a change in the rotational speed that is greater than or equal to the prescribed value has occurred in the wheels. On the other hand, when executing an ABS operation control only to the rear wheel 16, only the rear wheel 16 is set as the detection target, in terms of whether or not the state is one in which a change in the rotational speed that is greater than or equal to the prescribed value has occurred in the wheels. The prescribed state being established suggests the possibility that the front wheel 14, which is braked by an operation of the brake lever 20F, will be locked.

If the state of the bicycle 10 is determined to be in the prescribed state in step S4, the steps of the step S6 is executed. On the other hand, if the vehicle speed is determined to be less than the prescribed speed in the step S3, or, if the state of the bicycle 10 is determined to be not in the prescribed state in the step S4, the steps of the step S5 is executed.

The control device 60 returns the output of the assist motor 36 so that a drive force corresponding to the manual drive force will be outputted from the assist motor 36, in step S5. That is, the control device 60 returns the output of the assist motor 36, which was caused to be forcibly reduced in the step S2, to a state in which a drive force corresponding to the manual drive force is outputted. Then, after finishing the steps of step S5, the control device 60 executes the steps of the step S1 again.

The control device 60 switches the open/close state of the first valve 68F and the second valve 70F from the first pattern to the second pattern, in the step S6. Accordingly, the first valve 68F is closed and the second valve 70F is opened. Accordingly, the hydraulic pressure which is applied to the caliper 28F is reduced, and the braking force which is applied to the front wheel 14 is weakened.

The control device 60 causes the assist motor 36 to be rotated in the second direction, in the step S7. Drive force is transmitted from the assist motor 36 to the pump 62 and the pump 62 is driven by the assist motor 36 being rotated in the second direction. Accordingly, the hydraulic oil is supplied to the first pipeline 72F and the hydraulic pressure of the first pipeline 72F starts to be raised. With the hydraulic pressure of the first pipeline 72F being raised, the lever portion 21B of the brake lever 20F is pushed back toward the initial position.

The control device 60 determines whether or not a prescribed time has elapsed since executing the steps of the step S6, in the step S8. If the prescribed time is determined to have not elapsed in step S8, the steps of step S8 is executed again. On the other hand, if the prescribed time is determined to have elapsed in the step S8, the steps of the step S9 is executed.

The control device 60 switches the open/close state of the first valve 68F and the second valve 70F from the second pattern to the third pattern, in the step S9. Accordingly, both the first valve 68F and the second valve 70F are closed. Accordingly, the hydraulic pressure which is applied to the caliper 28F is maintained, and the braking force which is applied to the front wheel 14 is kept constant. The hydraulic pressure which is applied to the caliper 28F is continuously lowered until the valves 68F and 70F are switched from the second pattern to the third pattern.

The control device 60 determines whether or not the brake lever 20F is being operated on the basis of the detection result of the first detection device 82F, in the step S10. If the brake lever 20F is determined to be operated in step S10, the steps of the step S11 is executed.

The control device 60 determines whether or not the vehicle speed of the bicycle 10 is greater than or equal to a prescribed speed, on the basis of the detection results of the second detection devices 84F and 84R, in the step S11. The prescribed speed is preferably a speed of, for example, less than or equal to 5 km/hour. If the vehicle speed is determined to be greater than or equal to the prescribed speed in the step S11, the steps of the step S13 are executed. On the other hand, if the brake lever 20F is determined to be not operated in step S10, or, if the vehicle speed is determined to be less than the prescribed speed in step S11, the steps of the step S12 is executed.

The control device 60 switches the open/close state of the first valve 68F and the second valve 70F from the third pattern to the first pattern, in the step S12. Accordingly, the first valve 68F is opened and the second valve 70F is closed. Accordingly, the rotation of the front wheel 14 will be braked in conjunction with an operation of the brake lever 20F. Then, after finishing the steps of the step S12, the control device 60 executes the steps of the step S19 again.

In the step S13, the control device 60 executes substantially the same step as the step that is executed in the step S4. If the state of the bicycle 10 is determined to be in the prescribed state in the step S13, the step S14 is executed.

In step S14, the control device 60 executes substantially the same step as the step that is executed in step S6. Then, after finishing the step S14, the control device 60 executes the step S8 again. When executing the step S8 after the step S14, the control device 60 determines whether or not a prescribed time has elapsed since executing the step S14.

On the other hand, if the state of the bicycle 10 is determined to be not in the prescribed state in step S13, the step S15 is executed. In step S15, the control device 60 executes substantially the same step as the step that is executed in step S12.

The control device 60 determines whether or not the brake lever 20F is being operated on the basis of the detection result of the first detection device 82F, in step S16. If the brake lever 20F is determined to be operated in step S16, the step S17 is executed.

The control device 60 determines whether or not the vehicle speed of the bicycle 10 is greater than or equal to a prescribed speed, on the basis of the detection results of the second detection devices 84F and 84R, in step S17. The prescribed speed is preferably a speed of, for example, less than or equal to 5 km/hour. If the vehicle speed is determined to be greater than or equal to the prescribed speed in step S17, the step S18 is executed. On the other hand, if the brake lever 20F is determined to be not operated in step S16, or, if the vehicle speed is determined to be less than the prescribed speed in step S17, the step S19 is executed.

In step S18, the control device 60 executes substantially the same step as the step that is executed in step S4. If the state of the bicycle 10 is determined to be in the prescribed state in step S18, the step S14 is executed. On the other hand, if the state of the bicycle 10 is determined to be not in the prescribed state in step S18, the step S19 is executed.

The control device 60 determines whether or not a prescribed time has elapsed since executing the step S6 or the step S14, in the step S19. Specifically, whether or not a prescribed time has elapsed since the last step in which the open/close state of the valves 68F and 70F was switched to the second pattern is determined. The prescribed time is determined in advance, for example, on the basis of the time necessary to raise the amount of the hydraulic oil in the first pipeline 72F and the second pipeline 74F to a prescribed amount. The prescribed amount is, for example, substantially the same amount as the state prior to the step S6.

If the prescribed time is determined to have not elapsed in step S19, the step S19 is executed again. On the other hand, if the prescribed time is determined to have elapsed in step S19, the step S20 is executed.

The control device 60 stops the rotation of the assist motor 36 in the second direction, in step S20. Accordingly, the driving of the pump 62 is stopped. The control device 60 repeatedly executes the steps of the steps S1 to S20 until the ABS operating mode is switched to the ABS non-operating mode by the operating unit 86. If the assist OFF mode is selected by the operating unit 86, an ABS operation control in which the steps of the step S2 and the step S5 are omitted from the step shown in FIG. 3 and FIG. 4 is executed.

The action of the bicycle apparatus 56 will be described with reference to FIGS. 1 and 2.

The user operates the operating unit 86 before boarding, or while riding, the bicycle 10. The assist motor 36 is rotated in the first direction in accordance with the manual drive force that is inputted to the pedal 44, and an assisting force is added to the manual drive force, with the mode being set to the assist ON mode by the operating unit 86.

If the user operates the brake lever 20F when the vehicle speed is greater than or equal to a prescribed speed, then there are cases in which the front wheel 14 will be locked, depending on the state of the road surface or the strength with which the user grips the brake lever 20F. At this time, the assist motor 36 and the ABS unit 58F are controlled by the control device 60, and the braking force which is applied to the front wheel 14 of the bicycle 10 is controlled. Specifically, the steps S1 to S20 shown in FIGS. 3 and 4 are repeatedly executed, with the mode being set to the ABS operating mode by the operating unit 86.

Accordingly, even if the front wheel 14 is about to be locked following an operation of the brake lever 20F, the ABS unit 58F is driven by the control device 60 and the front wheel 14 is restored to the normal state. Accordingly, the user is less likely to lose balance during traveling.

Further, the pump 62 of the ABS unit 58F is driven by the assist motor 36 being rotated in the second direction. That is, assisting force is added to the manual drive force by the assist motor 36 being rotated in the first direction, and the pump 62 is driven by the assist motor 36 being rotated in the second direction. Accordingly, compared to a configuration in which assisting force is added to the manual drive force by the assist motor 36 and the pump 62 is driven by a drive source which is different from the assist motor 36, the bicycle apparatus 56 is less likely to be increased in size.

Accordingly, the embodiment can contribute to the reduction in size and weight of the bicycle 10.

According to the bicycle apparatus 56 of the first embodiment, the following effects are further achieved.

(1) The bicycle apparatus 56 causes the control device 60 to reduce the output of the assist motor 36, if the brake lever 20F is operated when the assist motor 36 is being rotated in the first direction. Accordingly, when the front wheel 14 is about to be locked following an operation of the brake lever 20F, the user is less likely to lose balance during traveling, since the output of the assist motor 36 is small.

(2) In the bicycle apparatus 56, the hydraulic pressure which is applied to the caliper 28F is reduced, and the pump 62 is driven by the assist motor 36 being rotated in the second direction, by the assist motor 36 and the ABS unit 58F being controlled by the control device 60. Accordingly, compared to a configuration in which the pump 62 is driven after reducing the hydraulic pressure that is applied to the caliper 28F, the amount of the hydraulic oil which flows in the first pipeline 72F and the second pipeline 74F can be raised at an early stage to a prescribed amount more easily.

(3) In the case that the rotational speed of the wheels of the bicycle 10 is less than a prescribed speed, that is, in the case that the vehicle speed of the bicycle 10 is less than a prescribed speed, the user is less likely to lose balance while traveling, even if the wheels are locked. In light of this point, the bicycle apparatus 56 does not drive the ABS unit 58F, or stops the driving of the ABS unit 58F, when the vehicle speed is determined to be in a state of less than a prescribed speed by the control device 60. Accordingly, the waste of power can be suppressed compared to a configuration in which the ABS unit 58F is driven, or a configuration in which the ABS unit 58F is continued to be driven, even when the vehicle speed is less than a prescribed speed.

(4) In the bicycle apparatus 56, the assist motor 36 and the ABS unit 58F are housed in the internal space of the housing 38. Accordingly, compared to a configuration in which a part of or all of the ABS unit 58F is provided outside the housing 38, the embodiment can contribute to the protection of the ABS unit 58F.

(5) According to the bicycle 10, there are cases in which the front wheel 14 will be about to be locked again when the brake lever 20F is being operated, even after the front wheel 14 is restored to the normal state by the hydraulic pressure which is applied to the caliper 28F being reduced following an operation of the ABS unit 58F. In light of this point, in the bicycle apparatus 56, the control device 60 executes the steps of step S16-step S18 after the front wheel 14 is restored to the normal state by the hydraulic pressure which is applied to the caliper 28F being reduced. Accordingly, the user is less likely to lose balance even when the wheel is about to be locked again, since the ABS unit 58F will be operated again.

Second Embodiment

The bicycle apparatus 56 according to the second embodiment differs from the bicycle apparatus 56 according to the first embodiment in the points described below, and comprises configurations that are substantially the same as the bicycle apparatus 56 according to the first embodiment in the other points. In the description of the bicycle apparatus 56 according to the second embodiment, the same reference symbols are given to configurations that are shared with the bicycle apparatus 56 according to the first embodiment, and some or all of the descriptions of the configurations thereof are omitted.

Figure 5:
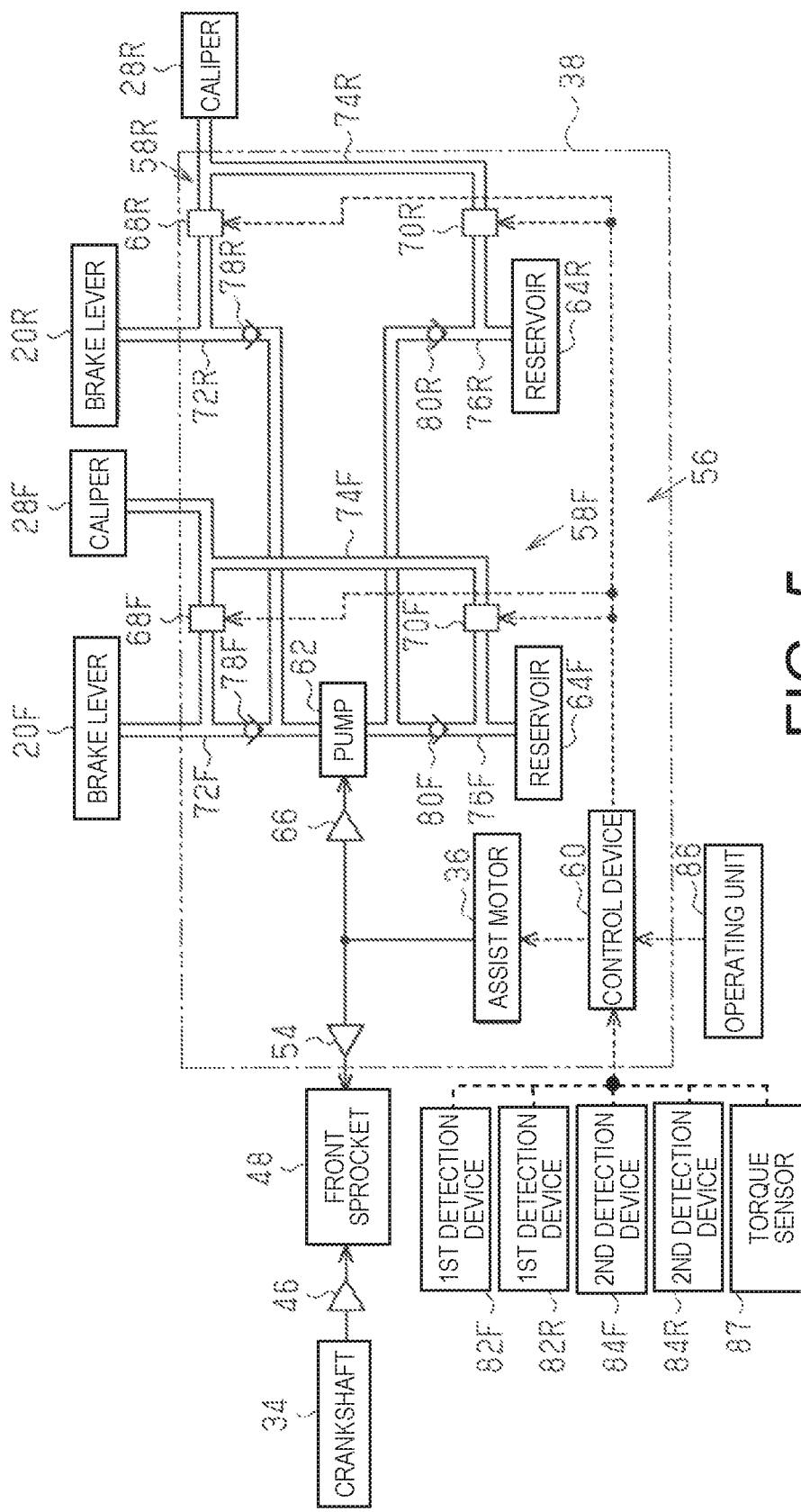
FIG. 5 is a block diagram of a bicycle according to the second embodiment.

FIG. 5 shows the electrical or the mechanical connection relationships of the bicycle 10 (refer to FIG. 1). The broken lines of FIG. 5 show the electrical connection relationships of the bicycle 10. The solid lines of FIG. 5 show the mechanical connection relationships of the bicycle 10.

The bicycle apparatus 56 comprises an ABS unit, which is driven by the assist motor 36, for controlling the braking force which is applied from the calipers 28F and 28R to the wheels. The ABS unit includes a first ABS unit 58F and a second ABS unit. The first ABS unit 58F is configured to control the braking force which is applied to the front wheel 14 (refer to FIG. 1). The second ABS unit 58R is configured to control the braking force which is applied to the rear wheel 16 (refer to FIG. 1). The ABS units 58F and 58R are housed in the internal space of the housing 38. The control device 60 controls the assist motor 36, the first ABS unit 58F and the second ABS unit 58R. Since the configuration of the first ABS unit 58F is substantially the same as the ABS unit 58F of the first embodiment, a part or all of the description thereof will be omitted.

The second ABS unit 58R comprises a pump 62 which is shared with the first ABS unit 58F, and a reservoir 64R which accumulates the hydraulic oil. The pump 62 is a common compositional element among the ABS units 58F and 58R, and plays the role of providing hydraulic pressure to the calipers 28F and 28R. The pump 62 can be provided to each of the ABS units 58F and 58R.

The second ABS unit 58R further comprises a first valve 68R and a second valve 70R for adjusting the hydraulic pressure which is applied to the caliper 28R. The first valve 68R has substantially the same configuration as the first valve 68F in the first ABS unit 58F. The first valve 68R is disposed on a pipeline which connects the brake lever 20R and the caliper 28R. The second valve 70R has substantially the same configuration as the second valve 70F in the first ABS unit 58F. The second valve 70R is disposed on a pipeline which connects the caliper 28R and the reservoir 64R.

When the hydraulic pressure that is applied to the caliper 28R is high, the caliper 28R is brought close to the disk rotor 26R (refer to FIG. 1). In this case, the caliper 28R squeezes the disk rotor 26R via the brake pad, and the rotation of the rear wheel 16 is braked. On the other hand, when the hydraulic pressure that is applied to the caliper 28R is low, the caliper 28R is separated from the disk rotor 26R. Accordingly, the rotation of the rear wheel 16 is not braked.

The hydraulic oil that is supplied from the pump 62 flows through the first pipeline 72F, the second pipeline 74F, and the third pipeline 76F in the first ABS unit 58F, as well as flowing through the first pipeline 72R, the second pipeline 74R, and the third pipeline 76R in the second ABS unit 58R. The first pipeline 72R, the second pipeline 74R, and the third pipeline 76R are each a pipeline that branches into three.

Each end of the first pipeline 72R is connected to the brake lever 20R, the pump 62, and the first valve 68R. The first pipeline 72R is connected to the pump 62 by being connected to a portion between the pump 62 and the first check valve 78F of the first pipeline 72F. Each end of the second pipeline 74R is connected to the caliper 28R, the first valve 68R, and the second valve 70R. Each end of the third pipeline 76R is connected to the pump 62, the reservoir 64R, and the second valve 70R. The third pipeline 76R is connected to the pump 62 by being connected to a portion between the pump 62 and the second check valve 80F of the third pipeline 76F.

The second ABS unit 58R further comprises a first check valve 78R and a second check valve 80R. The first check valve 78R is disposed on the first pipeline 72R. The second check valve 80R which is disposed on the third pipeline 76R. The first check valve 78R has substantially the same configuration as the first check valve 78F in the first ABS unit 58F. The second check valve 80R has substantially the same configuration as the second check valve 80F in the first ABS unit 58F.

The bicycle 10 further comprises a first detection device 82R (e.g., a brake lever detection device) for detecting the operating state of the brake lever 20R. The first detection device 82R has substantially the same configuration as the first detection device 82F. The first detection device 82R is electrically connected to the control device 60.

The operating unit 86 further comprises an ABS operation changeover switch (not shown) for switching between an ABS operating mode which puts the ABS units 58F and 58R in an operable state, and an ABS non-operating mode which puts the ABS unit 58F and 58R in a non-operating state.

The control device 60 controls the output and the rotational direction of the assist motor 36, on the basis of the detection results of the first detection devices 82F and 82R and the second detection devices 84F and 84R. The control device 60 switches the open/close state of the first valve 68F and the second valve 70F in the first ABS unit 58F, and the open/close state of the first valve 68R and the second valve 70R in the second ABS unit 58R, on the basis of the detection results of the first detection devices 82F and 82R and the second detection devices 84F and 84R. The control regarding the switching of the open/close state of the valves 68R and 70R in the second ABS unit 58R is substantially the same as the control regarding the switching of the open/close state of the valves 68F and 70F in the first ABS unit 58F.

The control device 60 starts the step shown in FIGS. 3 and 4, by being set to the ABS operating mode by the operating unit 86. The control device 60 determines whether or not the brake levers 20F and 20R are being operated on the basis of the first detection devices 82F and 82R, in the step S1, the step S10 and the step S16. When at least one of the brake levers 20F and 20R is being operated, the brake levers 20F and 20R are determined to be operated.

The control device 60 switches the open/close state of at least one of the first valve 68F and the second valve 70F in the first ABS unit 58F, and the first valve 68R and the second valve 70R in the second ABS unit 58R, from the first pattern to the second pattern, in the step S6.

For example, the control device 60 operates the ABS unit 58F and 58R that corresponds to the wheel in which a change in the rotational speed of a prescribed value or greater is detected in the step S4. That is, when the state is determined to be one in which a change in the rotational speed which is greater than or equal to a prescribed value has occurred in the rear wheel 16 in step S4, the control device 60 switches the open/close state of the first valve 68R and the second valve 70R in the second ABS unit 58R, from the first pattern to the second pattern, in step S6.

Further, the control device 60 operates the ABS unit 58F and 58R that corresponds to the wheel with the lower rotational speed, when, for example, the difference between the rotational speed of the front wheel 14 and the rotational speed of the rear wheel 16 is detected to have become greater than or equal to a prescribed speed, in step S4. That is, when the rotational speed of the rear wheel 16 is determined to be lower than the rotational speed of the front wheel 14 by a prescribed speed or more in the step S4, the control device 60 switches the open/close state of the first valve 68R and the second valve 70R in the second ABS unit 58R, from the first pattern to the second pattern, in the step S6. The same applies to the step S14 as the step S6.

The action of the bicycle apparatus 56 will be described with reference to FIGS. 1 and 5. If the user operates the brake levers 20F and 20R when the vehicle speed is greater than or equal to a prescribed speed, there are cases in which at least one of the front wheel 14 and the rear wheel 16 will be locked, depending on the state of the road surface or the strength with which the user grips the brake levers 20F and 20R. At this time, the assist motor 36 and the ABS units 58F and 58R are controlled by the control device 60, and the braking force which is applied to the front wheel of the bicycle 10 is controlled.

Accordingly, even if at least one of the front wheel 14 and the rear wheel 16 is about to be locked following an operation of the brake levers 20F and 20R, the ABS units 58F and 58R are driven by the control device 60 and the wheels are restored to the normal state. Accordingly, the user is less likely to lose balance during traveling.

According to the bicycle apparatus 56 of the second embodiment, the following effects are obtained in addition to the effects of (1) to (5) obtained according to the first embodiment.

(6) The bicycle apparatus 56 comprises the first ABS unit 58F for controlling the braking force which is applied to the front wheel 14, and the second ABS unit 58R for controlling the braking force which is applied to the rear wheel 16. Accordingly, even if one or both of the front wheel 14 and the rear wheel 16 are about to be locked following an operation of the brake levers 20F and 20R, the front wheel 14 and the rear wheel 16 are restored to the normal state, by the ABS units 58F and 58R being operated. Accordingly, the user is less likely to lose balance during traveling, compared to a configuration in which only one of the first ABS unit 58F or the second ABS unit 58R is provided.

MODIFIED EXAMPLES

The descriptions relating to each embodiment are examples of forms that the bicycle apparatus according to the present invention can take, and are not intended to limit the forms thereof. The bicycle apparatus according to the present invention can, in addition to the embodiments, take the forms of the modified examples of the embodiments shown below, as well as forms that combine at least two modified examples that are not mutually exclusive.

The control device 60 of a modified example executes the step S6 and the step S7 simultaneously in the ABS operation control. The control device 60 of another modified example executes the step S7 before the step S6 in the ABS operation control.

According to the control device 60 of a modified example, the step S16 to step S18 are omitted from the step shown in FIGS. 3 and 4, in the ABS operation control.

According to the control device 60 of a modified example, the step 19 is omitted from the step shown in FIGS. 3 and 4, in the ABS operation control. According to this modified example, the high-performance assist motor 36 which can drive the pump 62 so as to raise the amount of hydraulic pressure in a short period of time is preferably used.

According to the control device 60 of a modified example, the state in which the difference between the rotational speed of the front wheel 14 and the rotational speed of the rear wheel 16 has become greater than or equal to a prescribed speed is omitted from the prescribed state which is determined in the step S4, the step S13 and the step S18, shown in FIGS. 3 and 4.

The first detection devices 82F and 82R of a modified example are, instead an angle sensor, a hydraulic pressure sensor for detecting the hydraulic pressure of the first pipeline 72F and 72R. A hydraulic pressure sensor includes, for example, a pressure sensor which is provided on the inner wall of the first pipeline 72F and 72R.

The operating device of a modified example includes a grip, which brakes the rotation of the wheels when rotated around the axis of the handlebar 18 with respect to the handlebar 18, instead of the brake levers 20F and 20R. According to this modified example, the braking force which is applied to the wheels is adjusted according to the rotation amount of the grip. The operating device of another modified example includes a button which is attached to the handlebar 18, instead of the brake levers 20F and 20R. According to this other modified example, the braking force which is applied to the wheels is adjusted according to the amount that the button is pressed.

The brake devices 22F and 22R of a modified example is, for example, a rim brake or a cantilever brake, instead of a disc brake.

The bicycle apparatus 56 of a modified example of the first embodiment comprises an ABS unit 58R for controlling the braking force which is applied to the rear wheel 16, instead of the ABS unit 58F. The ABS unit 58R has substantially the same configuration as the second ABS unit 58R of the second embodiment.

Figure 6:
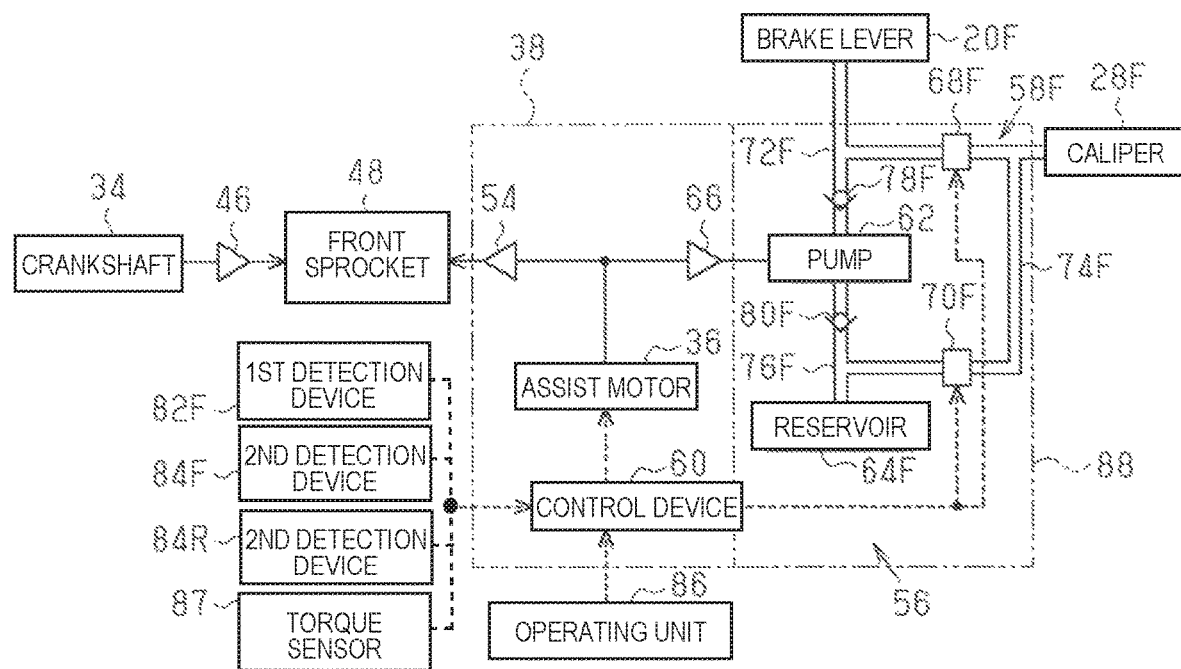
FIG. 6 is a block diagram of a modified example of the bicycle.

According to the bicycle apparatus 56 of a modified example of the first embodiment, the ABS unit 58F is attached to the outside of the housing 38. As shown in FIG. 6, the bicycle apparatus 56 further comprises a case 88 which is attached, for example, to the outside of the housing 38. According to this modified example, the ABS unit 58F is housed in the internal space of the case 88. The same modification can be realized in the second embodiment as well. According to the bicycle apparatus 56 of a modified example of the second embodiment, for example, at least one of the first ABS unit 58F and the second ABS unit 58R is housed in the internal space of the case 88.

In the bicycle apparatus 56 of a modified example of the first embodiment, the pump 62 of the ABS unit 58F is housed in the internal space of the housing 38, and the other elements of the ABS unit 58F are disposed outside of the housing 38. According to this modified example, the other elements of the ABS unit 58F are, for example, housed in the internal space of a case which is attached to the outside of the housing 38. The same modification can be realized in the second embodiment as well.

According to the bicycle apparatus 56 of a modified example, the control of the ABS units 58F and 58R by the control device 60 is dependent on the operation of the assist selection switch. For example, the mode is always switched to the ABS operating mode when the assist ON mode is selected.

According to the bicycle 10 of a modified example, the ABS operation changeover switch is omitted from the operating unit 86. According to this modified example, the mode is switched to the ABS operating mode by, for example, the assist ON mode being selected by the assist selection switch. On the other hand, the mode is switched to the ABS non-operating mode by the assist OFF mode being selected by the assist selection switch.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle apparatus comprising:
an ABS unit configured to control a braking force that is applied to at least one of a front wheel and a rear wheel of a bicycle;
a wheel detection device configured to detect a rotational speed of at least one of the front and rear wheels, the wheel detection device being configured to be attached to a bicycle frame at a location adjacent to at least one of the front and rear wheels,
the wheel detection device further including a front wheel detection device configured to detect a rotational speed of the front wheel and a rear wheel detection device configured to detect a rotational speed of the rear wheel,
the front wheel detection device including a magnetic sensor configured to be attached to the bicycle frame at a location adjacent to the front wheel, and
the rear wheel detection device includes a magnetic sensor configured to be attached to the bicycle frame at a location adjacent to the rear wheel; and
a control device configured
to control a motor configured to add an assisting force to a manual drive force inputted from a crankshaft of the bicycle,
to control the motor to stop adding the assisting force to the manual drive force during a braking operation,
to receive detection results from the wheel detection device, and
to determine whether the bicycle is in a prescribed state based on the detection results of the wheel detection device during the braking operation, the control device being further configured to execute an ABS operation control to control the ABS unit upon determining the bicycle is in the prescribed state, the prescribed state including at least one of:

a state in which a difference between the rotational speeds of the front and rear wheels is greater than or equal to a prescribed rotational speed, and a state in which a change in the rotational speed of the at least one of the front wheel and rear wheels is greater than or equal to a prescribed value has occurred.

2. The bicycle apparatus as recited in claim 1, further comprising a brake lever detection device configured to detect an operating state of a brake lever of the bicycle, the brake lever detection device being configured to output a detection result to the control device.

3. The bicycle apparatus as recited in claim 2, wherein the brake lever detection device is configured to detect an operation angle between a lever portion of the brake lever with respect to a base portion of the brake lever.

4. The bicycle apparatus as recited in claim 1, further comprising a front brake operatively coupled to a first ABS unit of the ABS unit.

5. The bicycle apparatus as recited in claim 4, further comprising a rear brake operatively coupled to a second ABS unit of the ABS unit.

6. The bicycle apparatus as recited in claim 4, wherein the front brake is a disc brake.

7. The bicycle apparatus as recited in claim 5, wherein the rear brake is a disc brake.

8. The bicycle apparatus as recited in claim 1, wherein the front wheel detection device further includes a magnet configured to be attached to one of a front rotor of the front wheel and a front spoke of the front wheel, and the rear wheel detection device includes a magnet configured to be attached to one of a rear rotor of the rear wheel and a rear spoke of the rear wheel.

9. The bicycle apparatus as recited in claim 1, wherein the front wheel detection device further includes a plurality of magnets circumferentially configured to rotate with the front wheel and the rear wheel detection device further includes a plurality of magnets circumferentially configured to rotate with the rear wheel.

10. The bicycle apparatus as recited in claim 1, wherein the ABS unit further comprises a pump for applying hydraulic pressure to a brake device that applied the braking force to the at least one of the front and rear wheels, the pump being configured to be driven by the motor.

11. The bicycle apparatus as recited in claim 10, wherein the motor is configured to drive the pump due to rotation of the motor.

12. The bicycle apparatus as recited in claim 11, wherein the control device is further configured to stop rotation of the motor upon determining the brake lever detection device detects that the brake lever is not operated.

13. The bicycle apparatus as recited in claim 10, further comprising a brake lever detection device configured to detect an operating state of a brake lever of the bicycle, the brake lever detection device being configured to output a detection result to the control device, and the control device being further configured to control the motor and the ABS unit based on information received by any one of the front and rear wheel detection devices and the brake lever detection device.

14. The bicycle apparatus as recited in claim 13, wherein the control device is configured to stop the rotation of the motor upon determining that a vehicle speed of the bicycle is less than a prescribed speed.

15. The bicycle apparatus as recited in claim 1, wherein the control device is configured to reduce the hydraulic pressure of the ABS unit that is applied to the brake device based on a rotation state of at the least one of the front and rear wheels.

* * * * *